3,737,529
CYCLIC O,O - (2,2 - DIMETHYLTRIMETHYLENE) PHOSPHOROCHLORIDOTHIOATE AS AN AGRICULTURAL PESTICIDE
Frank Albert Wagner, Jr., Pennington, N.J., assignor to American Cyanamid Company, Stamford, Conn.
No Drawing. Filed Nov. 11, 1971, Ser. No. 197,918
Int. Cl. A01n 9/36
U.S. Cl. 424—209         4 Claims

ABSTRACT OF THE DISCLOSURE

This invention relates to novel methods and insecticidal compositions for controlling a wide variety of insect pests. More particularly, the invention involves the use of cyclic O,O-(2,2-dimethyltrimethylene) phosphorochloridothioate as a contact, systemic or fumigant insecticidal agent.

---

This invention relates to novel methods and insecticidal compositions for controlling a wide variety of insect pests. More particularly, the invention involves the use of cyclic O,O-(2,2-dimethyltrimethylene) phosphorochloridothioate as a contact, systemic or fumigant insecticidal agent.

The compound, cyclic O,O-(2,2-dimethyltrimethylene) phosphorochloridothioate has been described in the literature and a process for its manufacture is revealed in the British Pat. 766,766, published Jan. 23, 1957.

According to the patentee, compounds of the general structure:

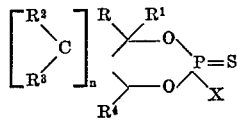

where the R groups are hydrogen or alkyl; $n$ is 0 or 1; and X is chlorine or bromine, are (1) potentially useful where biological activity is desired, and (2) useful as intermediates for neutral esters which can give rise to compounds having utility as oil additives or for other purposes.

It has been discovered that cyclic O,O-(2,2-dimethyltrimethylene) phosphorochloridothioate is an active insecticidal agent and is particularly effective when used as a contact, systemic or fumigant insecticide. Moreover, it was surprising to discover that said compound, while having a comparatively low mammalian toxicity which provides relative safety in handling, also exhibits extended residual insecticidal activity. This latter characteristic is of substantial importance because use of the above-named compound as an insecticidal agent for the protection of crops, permits such treated crops to reach maturity essentially free of insect damage. In practice, this means improved quality of produce and higher yields per acre.

The compound is useful for protecting a variety of crops such as sorghum, grains, cole crops, corn, cotton, onions, sugar beets, and the like, and particularly effective when used for the protection of corn, since it is highly toxic to rootworms, wireworms, and the like, which damage said crop.

The compound is also useful for controlling a variety of other insects such as those shown in the examples provided hereinbelow. It may be applied to the foliage of plants as a dust or liquid spray to protect them from insects which feed thereon; it may also be incorporated in or applied to the soil in order to protect germinating and growing plants from soil-borne pests which attack the root systems and stems of said plants; or it may be applied to the breeding sites of pests to control both the larvae and adult stages of breeding pest populations. In the latter situations, the compound may be applied in conventional formulations such as dusts, dust concentrates, granular materials, wettable powders, emulsifiable concentrates, and the like. It may be employed as an emulsion in water or other non-solvents to which suitable surfactants, wetting agents or emulsifying agents have been added.

Advantageously, the compound of the invention may also be applied by the most modern techniques of low volume application wherein the compound is applied in combination with a minor amount of a high aromatic hydrocarbon solvent such as Panasol AN–5, Socal 44–L or Esso HAN (all commercially available).

The compound of this invention may also be applied in combination with other essentially technical materials, such as Malathion, which in addition to having insecticidal properties also serve as a formulation vehicle.

Dusts may be prepared by impregnating a solid carrier with from about 1% to 25% by weight of the active material dissolved in a suitable solvent. From about 75% to 99% by weight of the inert solid carrier such as kaolin, cocoanut shell, corn cob grits, walnut shell, lignocellulose, attapulgite, diatomaceous earth, pumice, talc, or the like, is generally used.

Dust concentrates are made in the same fashion excepting that about 25% to 95% of the active ingredient is used. The diluent, as above-mentioned, generally constitutes the remainder of the formulation. Other additives such as sticking agents or deactivators can be used in the preparation of these formulations. Deactivators such as the alkylene glycols, diethylene glycol, propylene glycol, triethylene glycol, polyethylene glycol, and the like, can be used in an amount between about 1% and 20% by weight to treat the diluent and prevent stability problems.

Granular formulations are generally prepared by applying about 5% to 25% by weight of the active material to sorptive or non-sorptive particulate granular particles such as granular diatomites, clays, such as kaolin or attapulgite, ground corn cobs, sand, ground limestone, silica, activated carbon, and such. When non-sorptive carriers are used, the surface of the particles may be wetted with the active material, dissolved in an organic solvent such as the lower alcohols, toluene, xylene, or the like, and then coated with finely ground clay, talc, walnut shell flour, or other inert material. A binder or sticking agent may also be added to assure the adherence of the active material to the particles. It may also be desirable when using sorptive carriers such as the clays to first treat the clay particles with a deactivator as described above. Generally, 1% to 20% by weight of the deactivator is sufficient to avoid stability problems.

Emulsifiable concentrates can be prepared by admixing about 25% to about 95% by weight of the active material with an organic solvent such as mentioned above and an emulsifier, preferably an anionic-nonionic agent such as calcium dodecylbenzene sulfonate. Usually, about 2% to about 10% of the emulsifier is used. Where desired an inert organic solvent such as xylene or heavy aromatic naphthas such as Panasol AN–2, Esso HAN, or the like, containing about 60% to 100% aromatics and having a specific gravity between 0.88 and 1.5 at 60°/60° F., may also be added.

Wettable powders are prepared in about the same manner as dust concentrates excepting that about 1% to 5% by weight of a dispersing agent such as sodium lignin sulfonate, or a monocalcium salt of a polymerized alkyl aryl sulfonic acid is admixed with the dust and generally also about 1% to 5% of a surfactant is also added such as naphthalene sulfonic acid concentrate, polyoxyethylated vegetable oil or alkyl phenoxy polyoxyethylene ethanol.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

EXAMPLE 1

Preparation of cyclic O,O-(2,2-dimethyltrimethylene) phosphorochloridothioate

Into a solution of 169 grams (1.00 mole) of thiophosphoryl chloride and 158 grams (2.00 moles) of pyridine in 700 ml. of benzene, preheated to 65° C., was slowly added a hot solution of 104 grams (1.00 mole) of neopentyl glycol in 300 ml. of benzene. The temperature of the reaction mixture was maintained at 70° C. by external cooling (water bath) and by the rate of addition of the glycol solution (30 minutes). After the addition, the reaction mixture was heated at 75° C. for 30 minutes and then was cooled to room temperature. The solids were filtered and washed with 500 ml. of benzene. The benzene filtrate was washed with three 100 ml. portions of ice water and dried with magnesium sulfate. Reduced pressure evaporation of the organic solution gave 199 grams (99%) of white solid residue with melting point 84° C. to 88° C. Recrystallization from 1200 ml. of hexane gave 168 grams (84%) of product with melting point 89° C. to 90° C. Infrared and proton magnetic resonance spectra were in accord with theoretical expectations. The compound is soluble in most of the common organic solvents which are more polar than hexane.

EXAMPLE 2

The efficacy of cyclic O,O-(2,2-dimethyltrimethylene) phosphorochloridothioate for controlling a wide variety of insects which attack economically important crops is demonstrated by the following tests. Procedures utilized in this program are described below, and data obtained are reported as percent mortality in Table I.

Procedures

Southern armyworm—*Prodenia eridania* Cramer

The compound to be tested is prepared by dissolving or dispersing 0.1% by weight thereof in a 65% acetone/35% water mixture to be utilized in the following manner.

Sieva lima bean primary leaves are dipped for three seconds in the test solution and set in a hood on a screen to dry. When dry, each leaf is placed in a four-inch Petri-dish which has a moist filter paper in the bottom and ten third-instar armyworm larvae about ⅜ inch long. The dishes are covered and held at 80° F., and 60% r.h. After two days, mortality counts and estimates of the amount of feeding are made. Compounds showing partial kill and/or inhibition of feeding are held an extra day for further observations.

Bean aphid—*Aphis fabae* Scopoli

The compound is tested as an 0.1% or 0.01% solution or suspension in 65% acetone/35% water. Two-inch fiber pots, each containing a nasturtium plant two inches high and infested with about 150 aphids two days earlier, are placed on a turntable (4 r.p.m.) and sprayed for two revolutions with an atomizer at 20 p.s.i. air pressure. The spray tip is held about six inches from the plants and the spray is directed so as to give complete coverage of the aphids and the plants. The sprayed plants are laid on their sides on white enamel trays which have had the edges coated with No. 50 SAE oil as a barrier. Mortality estimates are made after holding for two days at 70° F., and 50% r.h.

Southern armyworm systemic test

The compound to be tested is formulated as an emulsion containing 0.1 gram of test material, 0.2 gram of Alrodyne 315 emulsifier, 10 ml. of acetone and 90 ml. of water. This is diluted tenfold with water to give a 100 p.p.m. emulsion for the initial test. A sieva lima bean plant with only the primary leaves unfolded is cut off just above soil level and inserted into a two ounce bottle of 100 p.p.m. emulsion and held in place by a bit of cotton wrapped around the stem. The bottle is then placed in a ventilated box with the leaves extending outside the box, such that any possible fumes from the compound will be drawn out the end of the box rather than rising to affect the test leaves. After holding three days at 80° F. and 60% r.h., one leaf from each plant is placed on a moist filter paper in the bottom of a Petri dish. Ten third-instar Southern armyworm larvae are then added to each dish and mortality counts made after holding another three days at 80° F. and 60% r.h.

Housefly—*Musca domestica* Linnaeus

Groups of 25 adult female houseflies are lightly anesthetized with carbon dioxide, placed in wide-mouth pint mason jars, and covered with a screen cap. The test compound is formulated as an emulsion containing 50 p.p.m. of test material, an emulsifier, acetone, and water. The mouth of the vial is covered with a single layer of cheesecloth, inverted and placed on the screen cap so that the flies can feed on the solution through the screen. Mortality counts are made after two days at 80° F.

Southern corn rootworm—*Diabrotica undecimpunctata howardi* Barber

The compound in test is formulated as a dust and incorporated into the soil at the equivalents of 50, 10, and 1 pounds per acre (p.p.a.). The soil is subsampled into bottles, and ten 6- to 8-days old rootworm larvae added to each bottle, which is then capped. Mortality counts are made after six days at 80° F., 60% r.h.

False wireworm—*Eleodes suturalis* Say

The efficacy of the test compound for controlling wireworms is determined in the same manner used above for determining efficacy in controlling rootworms, excepting that 10-day old wireworm larvae are substituted for rootworms.

Tobacco budworm—*Heliothis virescens*

*Heliothis virescens* (tobacco budworm) is placed in a one-ounce plastic medicine cup containing about 10 grams of artificial diet used for rearing tobacco budworms. Each budworm is treated topically on the dorsal surface with 0.96 µl. of acetone containing 40, 20, or 10 µg. of compound. If the mortality at the lowest rate is 50% or more, each succeeding concentration is reduced ½ until the activity is nil. The data are plotted on dosage-response logarithmic paper from which an $LD_{50}$ is determined.

The treatments are made with a ¼ cc. tuberculin syringe fitted with a No. 26 gauge hypodermic needle and driven by the spindle of a micrometer head. For convenience the vernier is turned ten divisions which delivers 0.96 µl.

After treatment, the cups are capped with plastic lids and held at 80° F. for 48-hour mortality counts. At least ten budworms are used for each concentration.

Cabbage looper—*Trichoplusia ni*

The procedure employed for determining the efficacy of the test compound for controlling cabbage looper is the same as that described for the Southern armyworm, excepting that *Trichoplusia ni* is substituted for *Prodenia eridania*.

TABLE I.—INSECT CONTROL WITH CYCLIC O,O-(2,2-DIMETHYLTRIMETHYLENE) PHOSPHOROCHLORIDOTHIOATE

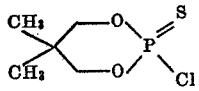

| Insect | Rate | Percent mortality |
|---|---|---|
| Southern Armyworm | 0.1% | 100 |
| Bean aphid | 0.1% | 100 |
| Do | 0.01% | 100 |
| Southern Armyworm (systemic) | 100 p.p.m. | 100 |
| Housefly | 50 p.p.m. | 100 |
| Corn Rootworm | 50 lbs./acre | 100 |
| Do | 10 lbs./acre | 100 |
| Do | 1 lb./acre | 100 |
| Tobacco Budworm | 0.1% | 100 |
| Do | 0.01% | 35 |
| Cabbage Looper | 0.1% | 100 |
| Wireworm | 50 lbs./acre | 100 |
| Do | 10 lbs./acre | 100 |

EXAMPLE 3

Fumigant test (Using adult houseflies)

100 mg. of test compound is diluted to 10 ml. with reagent-grade acetone. 0.1 ml. of this solution is pipetted uniformly onto Whatman's No. 1, 4.25 cm. filter paper. This gives a concentration of approximately 1.0 mg. per filter paper disk. The impregnated disk is suspended in a small enclosed copper screen cylinder (diameter=2⅞ inches, height=6 inches). The cage is placed in a battery jar (diameter=6 inches, height=8 inches). After about 5 minutes, 100 adult flies of mixed sexes and three to five days of age are placed in the battery jar and the jar capped with copper screen. The number of flies knocked down is recorded periodically.

The results are as follows:

| Structure | Adult houseflies, time in hours to yield 50% knockdown |
|---|---|
| CH₃, CH₃ cyclic phosphorochloridothioate | 1.8 |
| (CH₃O)₂P(S)-O-C₆H₃(CH₃)-NO₂ | >20.0 |
| (CH₃O)₂P(S)-O-C₆H₄-NO₂ | >4.0<20.0 |

From the above data it can be seen that the cyclic O,O-(2,2-dimethyltrimethylene) phosphorochloridothioate is vastly superior as an insect fumigant, to the commercially available compounds commonly referred to as Sumithion and Methyl Parathion, respectively.

EXAMPLE 4

Southern corn rootworm soil residual test

The compounds were prepared as 65% acetone solutions. One milliliter of solution of the required concentration is pipetted over a quart of potting soil in a stainless steel beaker approximately of one-gallon volume. The beaker is capped and placed on a mechanical mixer for thorough mixing. The treated soil is divided between four wide-mouth, one-half pint, paper cups, moistened with 100 ml. of water, and placed in a constant temperature room. The soil is allowed to dry and then water added to give a regime of alternate wetting and drying of the soil for the duration of the test period. At intervals, the soil is removed from the cup, thoroughly mixed, and bioassayed with Southern corn rootworm larvae.

Two one-ounce jars of soil are removed from each treatment, millet seed distributed throughout, and ten Southern corn rootworm larvae added. After six days in a constant temperature room, larval counts are made and converted to corrected percent mortality. Data obtained are provided in Table II.

TABLE II.—SOUTHERN CORN ROOTWORM RESIDUAL CONTROL

| Compound | Rate, lb./acre | Weeks after treatment— Percent corrected Mortality Southern Corn Rootworm | | | | | | | | |
|---|---|---|---|---|---|---|---|---|---|---|
| | | 0 | 1 | 2 | 3 | 4 | 5 | 6 | 7 | 8 |
| CH₃, CH₃ cyclic phosphorochloridothioate | 1 | 100 | 100 | 100 | 100 | 100 | 100 | 100 | 100 | 100 |

EXAMPLE 5

Single oral dose to mice

The acute oral LD$_{50}$ for mice is a basic value in the evaluation of the potential hazard of any new compound. Wherever possible, an attempt to estimate the oral LD$_{50}$ is made.

Procedure

Twenty male albino mice of the CFI strain, weighing approximately 18 grams to 20 grams are selected. The phosphates are readied for administration by preparing a solution or dispersion in corn oil (Mazola), the concentration of which is adjusted so that the total volume of the dose is 0.5 ml./kg. in every case. The initial solution is prepared by deciding upon the maximum dosage in mg./kg. to be administered and preparing 10 ml. of this solution of such a concentration that the desired dosage in mg./kg. is delivered when 0.5 ml. of the solution is administered for 20 grams of mouse body weight. Serial dilutions differing by a factor of two are then prepared for each lower dosage level.

The LD$_{50}$ for cyclic O,O-(2,2-dimethyltrimethylene) phosphorochloridothioate is approximately 117 mg./kg.

I claim:

1. A method for controlling insects on plants or in the soil which comprises: applying to said plants or to said soil an insecticidally effective amount of cyclic O,O-(2,2-dimethyltrimethylene) phosphorochloridothioate.

2. A method for controlling insects which comprises applying to said insects and insecticidally effective amount of cyclic O,O-(2,2-dimethyltrimethylene) phosphorochloridothioate.

3. A method for controlling soil-borne insects in the soil which comprises: applying to said soil an insecticidally effective amount of cyclic O,O-(2,2-dimethyltrimethylene) phosphorochloridothioate.

4. The method according to claim 3 wherein said compound is applied at the rate of from about one pound per acre to 50 pounds per acre.

References Cited

FOREIGN PATENTS 766,766    1/1957    Great Britain.

OTHER REFERENCES

Edmundson, vol. 63 (1965) pp. 17875–17876.

ALBERT T. MEYERS, Primary Examiner

A. J. ROBINSON, Assistant Examiner

U.S. Cl. X.R.

Dig.—8